(12) United States Patent
Thomas

(10) Patent No.: US 9,493,213 B2
(45) Date of Patent: Nov. 15, 2016

(54) WAKE SURF SHAPER

(71) Applicant: Nathan Michael Thomas, Garland, TX (US)

(72) Inventor: Nathan Michael Thomas, Garland, TX (US)

(*) Notice: Subject to any disclaimer, the term of this patent is extended or adjusted under 35 U.S.C. 154(b) by 0 days.

(21) Appl. No.: 14/795,479

(22) Filed: Jul. 9, 2015

(65) Prior Publication Data

US 2016/0009342 A1 Jan. 14, 2016

Related U.S. Application Data

(60) Provisional application No. 62/022,761, filed on Jul. 10, 2014.

(51) Int. Cl.
*B63B 9/00* (2006.01)
*B63B 1/32* (2006.01)
*B63B 35/81* (2006.01)

(52) U.S. Cl.
CPC ............... *B63B 1/32* (2013.01); *B63B 35/815* (2013.01); *Y02T 70/12* (2013.01)

(58) Field of Classification Search
CPC .................................. B63B 9/00; B63B 1/32
USPC .......................... 114/271, 284–285
See application file for complete search history.

(56) References Cited

U.S. PATENT DOCUMENTS

| | | | | |
|---|---|---|---|---|
| 5,611,295 A * | 3/1997 | Stables | ................. | B63B 35/731 114/126 |
| 5,860,766 A * | 1/1999 | Lochtefeld | ......... | A63B 69/0093 114/253 |
| 6,105,527 A * | 8/2000 | Lochtefeld | ......... | A63B 69/0093 114/125 |
| 6,712,016 B1 * | 3/2004 | Morisch | ................... | B63B 1/18 114/126 |
| 7,174,843 B1 * | 2/2007 | Tossavainen | ......... | B63B 39/061 114/280 |
| 7,252,047 B1 * | 8/2007 | Baucom, Jr. | ......... | A63B 69/187 114/284 |
| 8,453,591 B2 * | 6/2013 | Mannerfelt | ............. | B63B 1/322 114/272 |
| 8,833,286 B1 * | 9/2014 | Sheedy | ................... | B63B 1/286 114/285 |
| 9,032,897 B2 * | 5/2015 | Argo | ........................ | B63B 1/22 114/271 |
| 9,334,022 B2 | 5/2016 | Gasper | | |
| 2008/0190348 A1 * | 8/2008 | Baker | ..................... | B63B 1/042 114/288 |
| 2016/0009342 A1 * | 1/2016 | Thomas | ................... | B63B 1/32 114/271 |

* cited by examiner

*Primary Examiner* — Lars A Olson
*Assistant Examiner* — Jovon Hayes
(74) *Attorney, Agent, or Firm* — Foster Swift Collins & Smith, P.C.; Zachary W. Behler

(57) ABSTRACT

The inventive technology comprises a wake surf shaper that can be used to modify the wake of a watercraft to make it more "surfable." It has been discovered that removably attaching the inventive wake surf shaper to one side of a boat's hull interrupts the flow of water diverted around one side of the bow applying force to the hull in such a manner as to dam the column of water diverted around the opposite side of the bow such that the release of water creates an increased wake behind the boat.

20 Claims, 6 Drawing Sheets

WAKE SURF SHAPER

CROSS REFERENCE TO RELATED APPLICATIONS

This application claims priority to U.S. provisional application Ser. No. 62/022,761, entitled "Wake Surf Shaper," filed Jul. 10, 2014.

FIELD OF INVENTION

The present invention relates to the field of wake enhancement devices for sporting boats, and in particular, to a multi-locational wedge that can be fastened to the starboard or port side of the hull to amplify, elongate, or smooth the boat's wake.

BACKGROUND

In recent years the sport of wake surfing, performing surfing maneuvers on a surfboard in the wake of a boat without using a tow rope, has become popular among water sports enthusiasts. Wake surfing maneuvers are akin to those performed on natural ocean coastlines. However, wake surfing has been limited as a sport by the lack of boats capable of making good surfable waves at a safe distance behind the boat. Wake surfing requires a large wake pattern of "surfable" quality to enable the rider to perform surfing maneuvers. New boats have been equipped with various systems to generate a better surfable wake. However, generation of sufficiently large, steep, surfable quality waves using older conventional ski boats is not practical.

Conventional water ski boats are not designed to make waves but, rather, to minimize them in order to minimize power and to provide the smooth wake patterns that high speed skiing requires. Thus, the goal of traditional ski boat design is to lessen displacement, decrease drag, and enable the boat to travel faster with less energy. This is achieved, for example, by light displacement, straight after-buttock lines, a shallow-V bottom, and a bluff transom, so that the boat operates at high speed in a fully planing mode. In order to generate an increase in wake size, wakeboarders have attempted to overcome the design objectives of traditional water ski boats by adding static ballast to the boat. Such ballast is usually in the form of water filled bags, concrete blocks, or other such weighted objects that disadvantageously occupy inboard passenger space. One other significant disadvantage to static ballast is that it can easily lead to an unsafe overload condition and scuttling.

Even a ski boat ballasted for wakeboarding will only produce a wave that is not of surfable quality at normal speeds. Therefore, creating a surfable wave with a conventional ski boat typically involves a reduction in speed to less than 10 mph along with the addition of ballast to the boat. At such speeds and weights, the waves created by the boat are typically within a few feet of the boat's transom, as well as the exhaust and propeller, making wake surfing using conventional ski boats difficult to perform, unhealthy and dangerous.

In view of these limitations, as outlined above, the invention described below is a multi-locational wedge that can be removably fastened to the starboard or port side of the hull to amplify, elongate, or smooth the boat's wake. When the boat is operated at designated speeds using the device it produces enhanced "surfable" wake patterns.

SUMMARY

The wake surf shaper of the invention can be used to modify the wake of a watercraft to make it more "surfable." It has been discovered that removably attaching the inventive wake surf shaper to one side of a boat's hull interrupts the flow of water diverted around one side of the bow applying force to the hull in such a manner as to dam the column of water diverted around the opposite side of the bow such that the release of water creates an increased wake behind the boat.

At least one embodiment of the inventive technology comprises a wake surf shaper which has a hull attachment surface which extends substantially from bow to stern at or near the water line, an outer surface which interrupts the flow of water diverted around one side of the bow, substantially symmetrical top and bottom surfaces configured to fit the space between the hull attachment side and the outer surface, a rear surface, and a means for removably attaching the hull attachment surface to the hull of the boat.

DESCRIPTION

Figure 1:
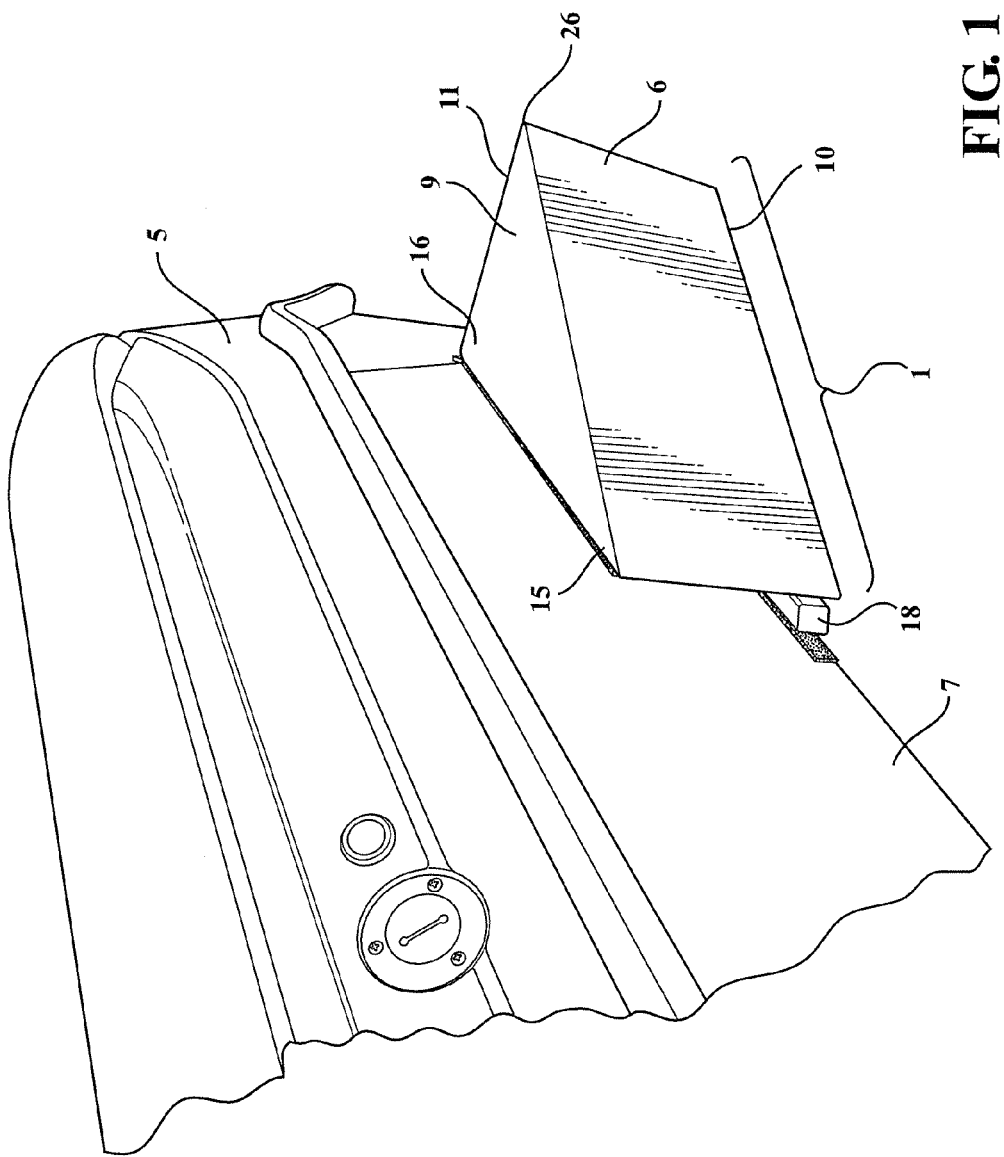
FIG. 1 is a perspective view of an embodiment of the wake surf shaper attached to the hull of a boat.

The following description is presented to enable a person skilled in the art to make and/or use the invention. For purposes of explanation, specific nomenclature is set forth to provide a thorough understanding of the present invention. The present invention includes a variety of aspects, which may be combined in different ways. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

At least one of the inventive embodiments of the wake surf shaper is a wake surf shaper 1 that comprises a hull attachment surface 2 which extends substantially from bow 3 to stern 4 of the boat 5 at or near the water line, an outer surface 6 which interrupts the flow of water diverted around one side of the bow 3 applying force to the hull 7 in such a manner as to dam the water diverted around the opposite side of the bow 3 such that the release of water creates an increased wake 8 behind the boat 5. The inventive embodiment further comprises substantially symmetrical top 9 and bottom 10 surfaces residing between the hull attachment surface 2 and the outer surface 6 and a rear surface 11 adjoining the rear of the hull attachment surface 2, the top surface 9, the bottom surface 10, and the outer surface 6. The wake surf shaper 1 of the invention also includes a means for removably attaching the hull attachment surface to the hull of the boat 12.

Figure 3:
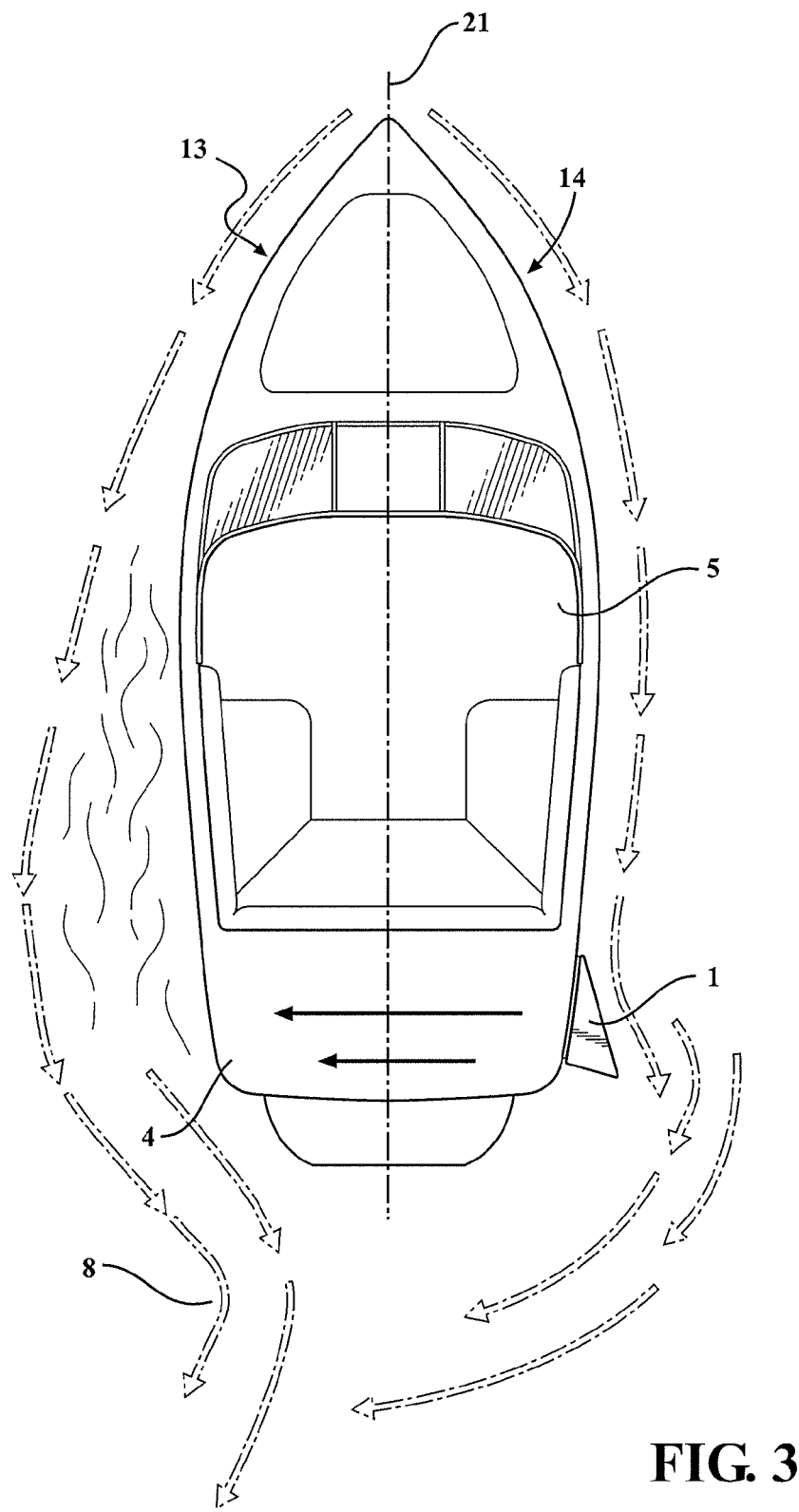
FIG. 3 is a top view of an embodiment of the wake surf shaper attached to the hull of a boat.
Figure 5:
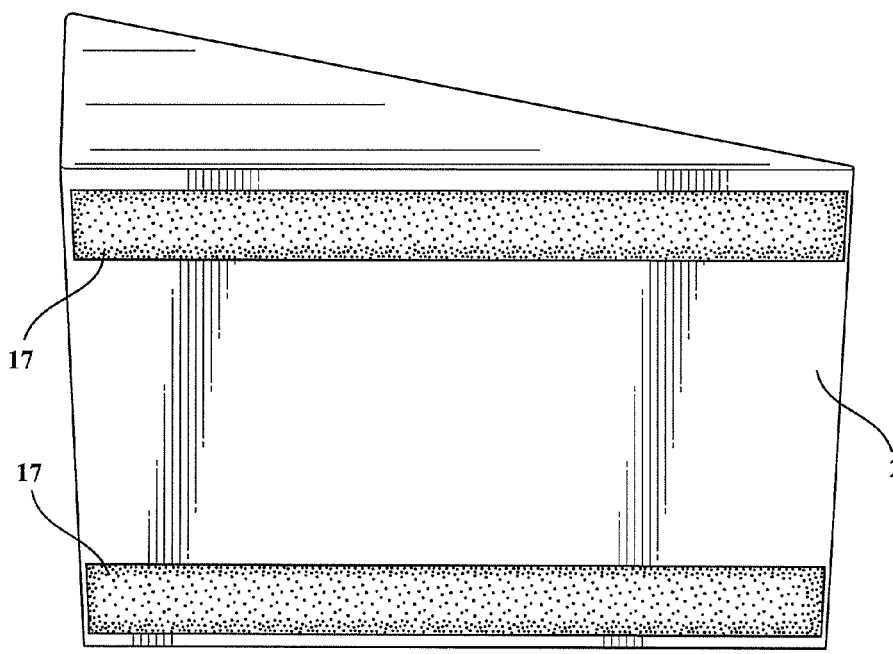
FIG. 5 is view of the hull attachment surface of an embodiment of the wake surf shaper.
Figure 6:
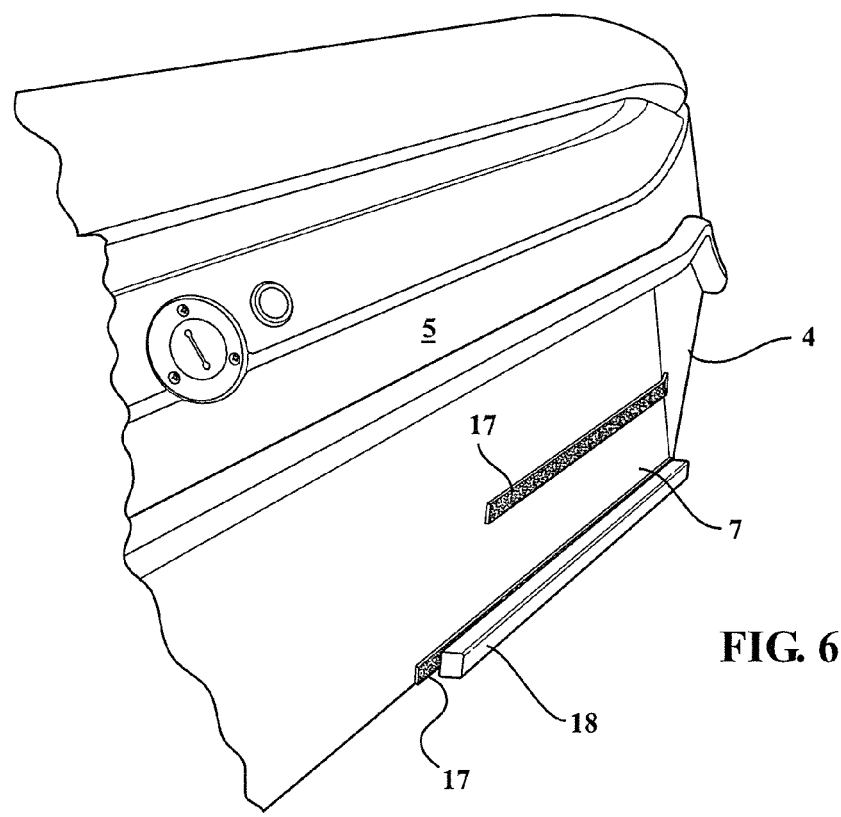
FIG. 6 is view of the hull depicting the means for attaching the hull attachment surface.

FIG. 1 is a perspective view of an embodiment of the inventive wake surf shaper 1. As depicted in FIG. 1, the wake surf shaper 1 may be mounted on the port side 13 of the hull 7, but may also be mounted on the starboard side 14 (FIG. 3). Also depicted in FIG. 1 is the angle between the outer surface and the attachment surface 15 that is located at the bow 3 end of the wake surf shaper 1 and the angle between the attachment surface and the rear surface 16 that is located at the stern 4 end of the wake surf shaper 1. As depicted FIG. 1, in the preferred embodiment, the means for removably attaching the hull attachment side to the hull of the boat 12 is adhesive hook and look fasteners 17 (FIGS. 5 and 6). Hook and loop fasteners of various strength may be utilized in various formations to insure adequate attachment while the boat 5 is in motion. However, preferred embodiments use hook and loop fasteners with an adhesive strength in excess of one pound per square inch. In preferred embodiments, the hook and look fasteners 17 are positioned on the side of the hull 7 in two parallel strips (FIG. 6) oriented from bow 3 to stern 4. Two corresponding strips of hook and loop fasteners 17 are place mounted on the hull attachment surface 2 (FIG. 5). However, other means for removably attaching the hull attachment side to the hull of the boat 12 are possible such as locking rail systems, eyelets, slots, clasps, or other forms of mechanical attachment.

Figure 2:
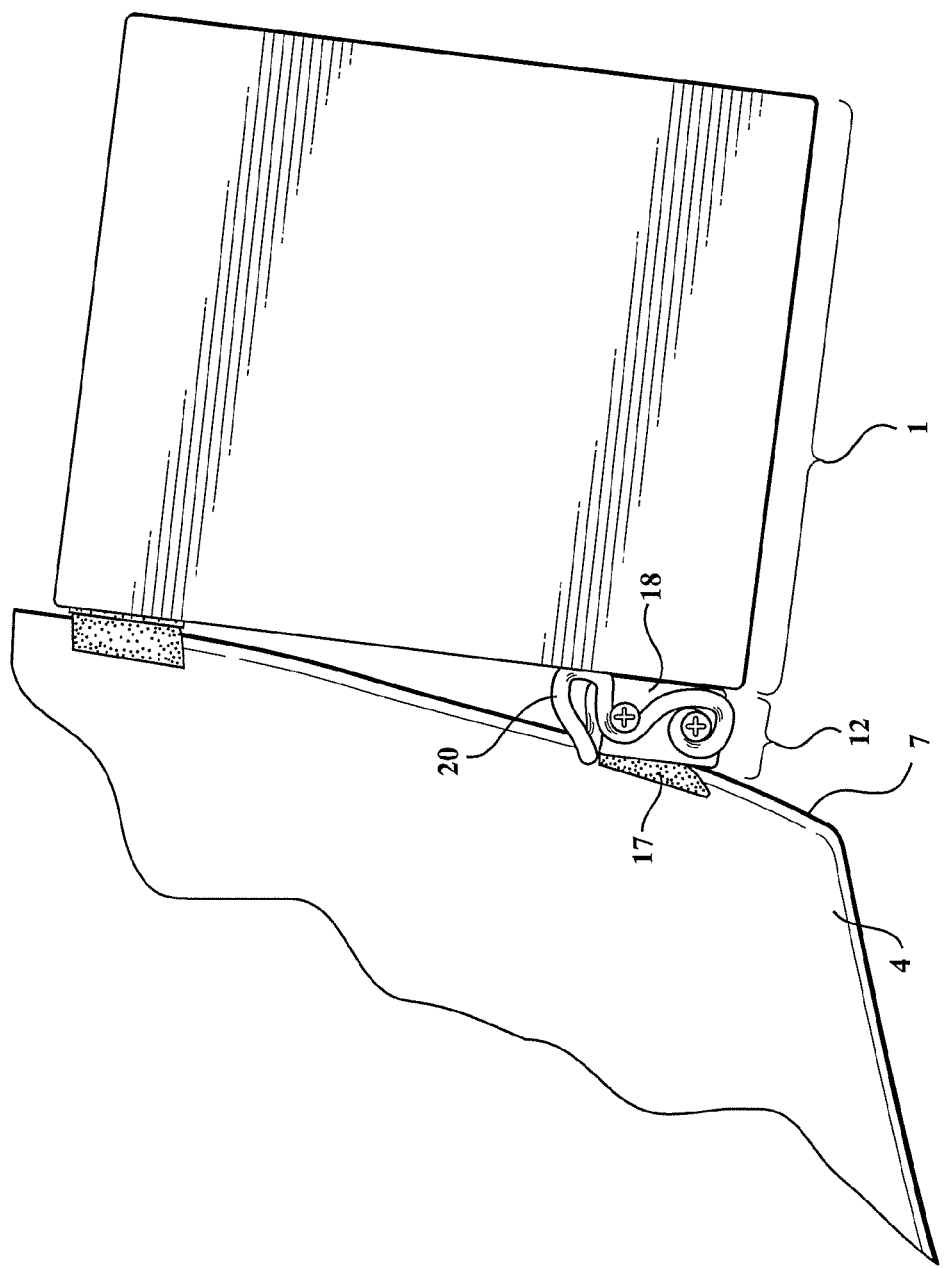
FIG. 2 is a rear view of an embodiment of the wake surf shaper attached to the hull of a boat.
Figure 7:
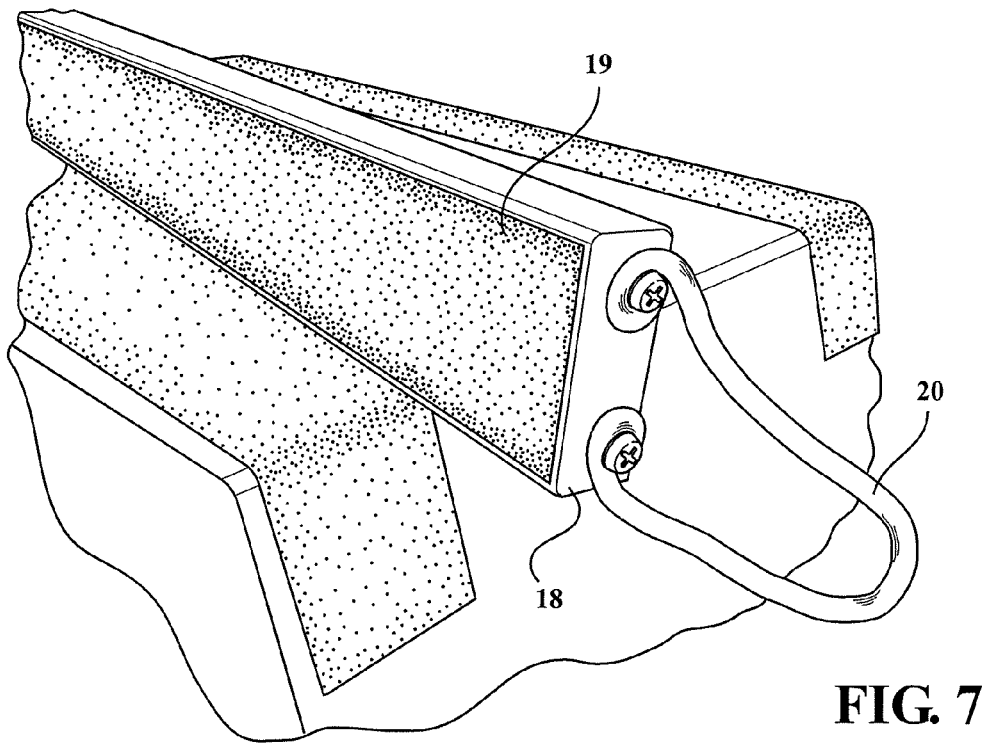
FIG. 7. is a is a perspective view of a shim.

FIG. 2 is a rear view of an embodiment of the inventive wake surf shaper 1 mounted on a boat 5. As depicted in FIG. 2, the means for removably attaching the hull attachment side to the hull of the boat 12 may include a shim 18 to adapt the wake surf shaper 1 to the curvature of the hull 7. FIG. 6 depicts the shim 18 attached to the hull 7 before the wake surf shaper 1 is attached. In the preferred embodiment the shim 18 runs from bow 3 to the stern 4 end of the lower strip of hook and loop fasteners 17. In a preferred embodiment, the shim 18 is fitted with shim hook and loop fasteners 19 that parallel the hook and loop fasteners 17 on the hull 7 and hull attachment surface 2 (FIG. 7). The shim 18 may also be equipped with a handle 20 to ease removal while the boat 5 is on the water. The wake surf shaper 1 is preferably positioned so the top surface 9 is at or slightly below the waterline while in use. However, the user may choose whether to attach the wake surf shaper 1 to the port 13 or starboard 14 side of the hull 7 based on the preferences of the rider. Further, the positioning of the wake surf shaper 1 in relation to the bow 3 and the stern 4 may be adjusted on the side of the hull 7 to shape the wake 8 based on the preferences of the rider.

FIG. 3 is a top view of an embodiment of the inventive wake surf shaper 1 attached to a boat 5 illustrating the flow of water around the opposite sides of the bow 3. In FIG. 3, arrows denote the flow of water around the boat when the wake surf shaper is 1 in use. When in use, water flows around one side of the bow 3 along the hull 7 and encounters the wake surf shaper 1. The wake surf shaper 1 interrupts the flow of water and applies force to the hull 7 pushing the stern 4 of the boat 5 away from the wake surf shaper 1. The displacement of the stern 4 causes the centerline 21 of the boat 5 out of parallel with the direction of travel. This displacement of the hull 7 causes water to dam against the side of the hull 7 opposite the wake surf shaper 1. As this dammed water is released at the stern 4 it creates an increased wake 8 behind the boat 5.

Figure 4:
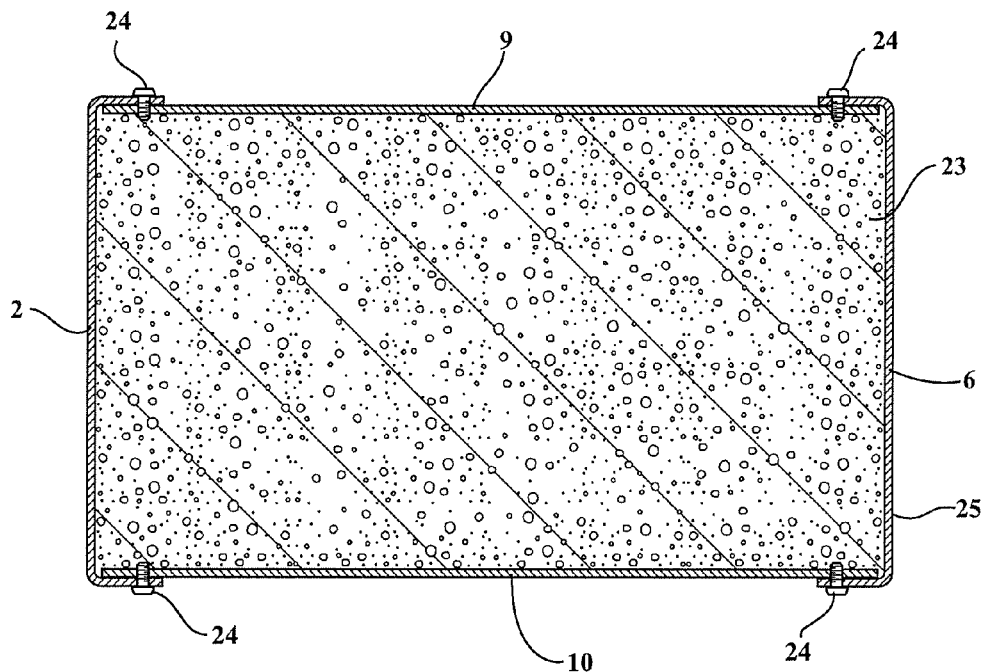
FIG. 4 is a cross sectional view of an embodiment of the wake surf shaper.

FIG. 4 is a cross sectional view of the inside of an embodiment of the wake surf shaper 1. As depicted in FIG. 3, a preferred embodiment of the inventive wake surf shaper 1 may include an interior cavity 22 that can be filled with foam 23. Filling the interior cavity 22 with foam 23 may increase the strength of the wake surf shaper 1 and aid in floatation. When utilized, foam 23 can made from any material that is suitable for submergence, such as polyurethane sealant, or other expanding foam material. In some embodiments, the hull attachment 2, outer 6, top 9, bottom 10, and rear 11 surfaces may be constructed out of distinct panels and assembled with fasteners 24 such as screws, nails, rivets, or staples. In other embodiments, the hull attachment 2, outer 6, top 9, bottom 10, and rear 11 surfaces may be formed from a single piece of material. This is true in embodiments in which the hull attachment 2, outer 6, top 9, bottom 10, and rear 11 surfaces are formed by compression molded fiberglass packed with foam, formed by injection molded carbon fiber, or other similar construction methods. In some embodiments an exterior coating 25 may be added to enhance the appearance, durability, and water resistance of the wake surf shaper 1. When utilized, the exterior coating 25 can be made of rubberized polyurethane, fiberglass with gel coat, or other similar material that enhances the appearance, durability, and water resistance of the wake surf shaper 1.

Figure 8:
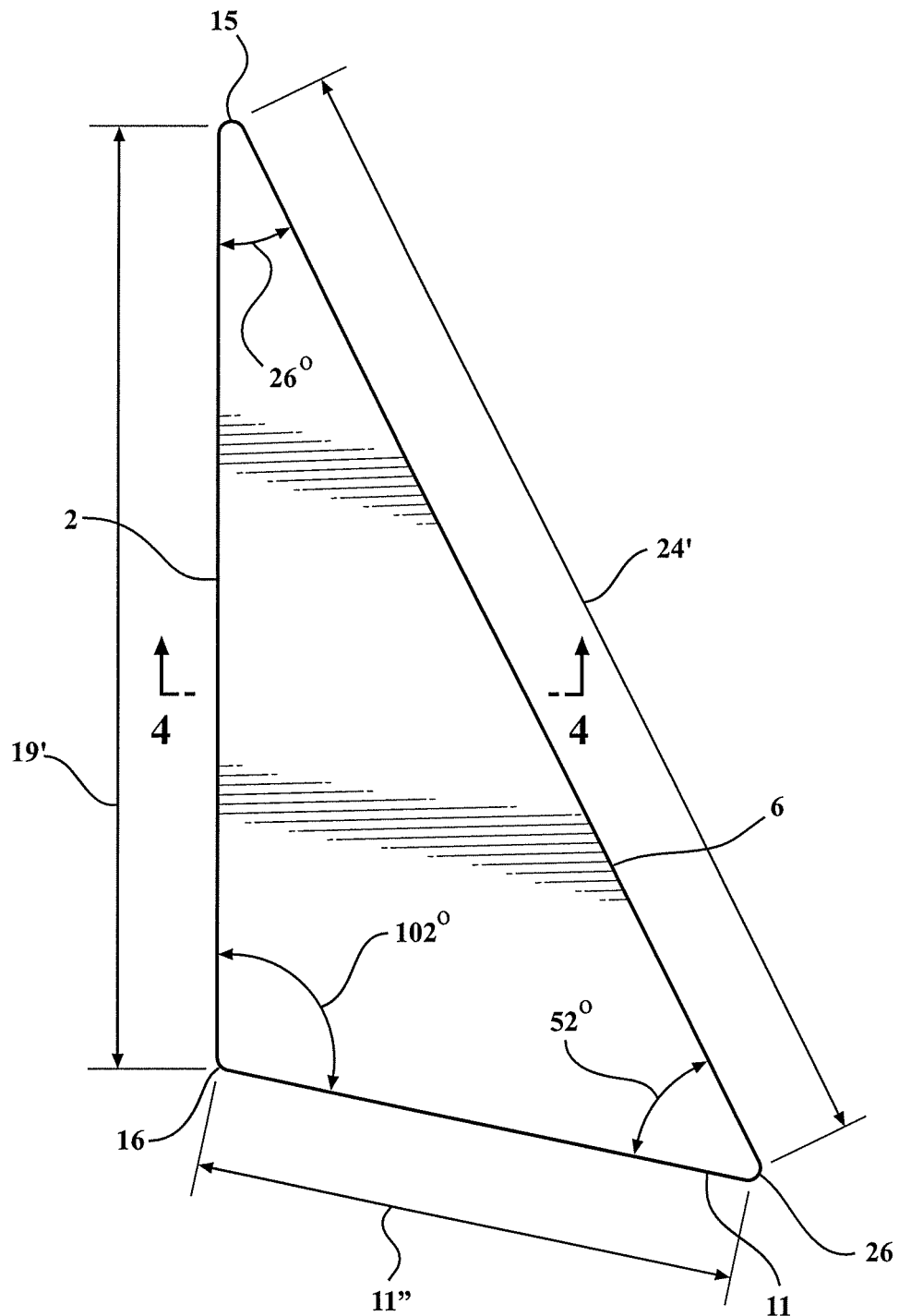
FIG. 8. is a plan view of an embodiment of the wake surf shaper.

FIG. 8 is a top view of an embodiment of a wake surf shaper 1. In the embodiment depicted in FIG. 8 exemplary measures for the angle between the outer surface and the hull attachment surface 15 and the angle between the hull attachment surface and rear surface 16 are provided. It has been found that the effectiveness of the wake surf shaper 1 is enhanced if the length from bow 3 to stern 4 is at least twice the width from the hull 7 to the angle between the outer surface and rear surface 26 to decrease the likelihood that the hook and loop fasteners 17 will sheer from the boat 5 while in use. However, smaller length to width ratios can be used if the means for removably attaching the hull attachment side to the hull of the boat 12 is not prone to shearing. For this same reason, the angle between the hull attachment surface and the outer surface 15 is preferably less than 45 degrees and angle between the hull attachment surface and rear surface 16 is preferably greater than 90 degrees.

While the above description contains many specifics, these should not be construed as limitations on the scope of the invention, but rather as an exemplification of one preferred embodiment thereof. Many other variations are possible including similar removable attachments to one side of a boat's hull that interrupts the flow of water diverted around one side of the bow applying force to the hull in such a manner as to dam the column of water diverted around the opposite side of the bow such that the release of water creates an increased wake behind the boat. Accordingly, the scope of the invention should be determined not by the embodiments illustrated, but by the appended claims and their legal equivalents.

The invention claimed is:

1. A wake surf shaper comprising: a hull attachment surface which extends substantially from bow to stern; an outer surface which interrupts the flow of water diverted around one side of the bow applying force to the hull in such a manner as to dam the column of water diverted around the opposite side of the bow such that the release of said water creates an increased wake behind the boat; substantially symmetrical top and bottom residing between the hull attachment surface and the outer surface; a rear residing between rear of the hull attachment surface, the top and bottom, and the outer surface; and a means for removably attaching the hull attachment surface to either the port or starboard side of the hull-of-the boat.

2. The wake surf shaper of claim 1, wherein the means for removably attaching the hull attachment surface to the boat comprises hook and loop fasteners on the hull.

3. The wake surf shaper of claim 2, wherein means for removably attaching the hull attachment side to the boat further comprises:
a shim.

4. The wake surf shaper of claim 1 further comprising:
an outer coating which covers the exterior of the device.

5. The wake surf shaper of claim 4, wherein an outer coating comprises a rubberized polymer.

6. The wake surf shaper of claim 1, wherein the surfaces are defined by a semi rigid material.

7. The wake surf shaper of claim 6, wherein at least one of the surfaces is defined by PVC sheeting.

8. The wake surf shaper of claim 6, wherein the edges of the surfaces are connected with staples.

9. The wake surf shaper of claim 6, wherein the interior of the device is filled with polyethylene foam.

10. The wake surf shaper of claim 6, wherein the surfaces are formed by compression molded fiberglass packed with foam.

11. The wake surf shaper of claim 6, wherein the surfaces are formed by injection molded carbon fiber.

12. The wake surf shaper of claim 1, wherein the angle between the hull attachment surface and the outer surface is less than 45 degrees.

13. The wake surf shaper of claim 12, wherein the length of the hull attachment surface is at least twice the width of the rear surface.

14. The wake surf shaper of claim 12, wherein the angle between the hull attachment surface and the rear surface is greater than 90 degrees.

15. The wake surf shaper of claim 1, wherein the means for removably attaching the hull attachment surface to the boat is positioned so the top of the device is at or slightly below the waterline while in use.

16. A method for improving the quality and size of a wake created behind a boat, comprising:
attaching the attachment surface of the wake surf shaper of claim 1 to a boat; and
causing the boat to travel through a body of water, wherein as the boat travels through the water, the outer surface of the wake surf shaper interrupts the flow of water diverted around one side of the bow applying force to the hull in such a manner as to dam the column of water diverted around the opposite side of the bow such that the release of water creates an increased wake behind the boat.

17. The method of claim 16, wherein the step of attaching the attachment surface of the wake surf shaper of claim 1 to a boat further comprises:
positioning the wake surf shaper so the top of the device is at or slightly below the waterline while in use.

18. The method of claim 16, wherein the step of attaching the attachment surface of the wake surf shaper of claim 1 to a boat further comprises:
attaching a shim to the hull of the boat.

19. The method of claim 16, further comprising the step of:
choosing the side to attach the wake surf shaper based on the preferences of the rider.

20. The method of claim 16, further comprising the step of:
adjusting the position of the wake surf shaper on the side to shape the wake based on the preferences of the rider.

* * * * *